(12) United States Patent
Takagi

(10) Patent No.: US 9,900,579 B2
(45) Date of Patent: Feb. 20, 2018

(54) DEPTH-SENSING CAMERA DEVICE HAVING A SHARED EMITTER AND IMAGER LENS AND ASSOCIATED SYSTEMS AND METHODS

(71) Applicant: Intel Corporation, Santa Clara, CA (US)

(72) Inventor: Akihiro Takagi, San Mateo, CA (US)

(73) Assignee: Intel Corporation, Santa Clara, CA (US)

( * ) Notice: Subject to any disclaimer, the term of this patent is extended or adjusted under 35 U.S.C. 154(b) by 96 days.

(21) Appl. No.: 14/757,878

(22) Filed: Dec. 26, 2015

(65) Prior Publication Data

US 2017/0188012 A1 Jun. 29, 2017

(51) Int. Cl.
*H04N 13/00* (2006.01)
*H04N 13/02* (2006.01)
*H04N 5/33* (2006.01)

(52) U.S. Cl.
CPC ........... *H04N 13/0239* (2013.01); *H04N 5/33* (2013.01); *H04N 13/0022* (2013.01); *H04N 13/0253* (2013.01)

(58) Field of Classification Search
CPC .. H04N 13/0239; H04N 13/0022; H04N 5/33; H04N 13/0253
USPC .......................................................... 348/43
See application file for complete search history.

(56) References Cited

U.S. PATENT DOCUMENTS

| 7,763,841 B1* | 7/2010 | McEldowney | B29D 11/0073 250/216 |
| 2005/0117117 A1* | 6/2005 | Bourla | A61B 3/1005 351/221 |
| 2013/0041226 A1* | 2/2013 | McDowall | A61B 1/00009 600/166 |
| 2013/0258044 A1* | 10/2013 | Betts-Lacroix | H04N 13/0242 348/36 |
| 2014/0176656 A1* | 6/2014 | Omori | G03G 15/04072 347/118 |

* cited by examiner

*Primary Examiner* — William Tran
(74) *Attorney, Agent, or Firm* — Thorpe North & Western, LLP; David W. Osborne

(57) ABSTRACT

Devices, systems, and associated methods for capturing three-dimensional (3D) infrared (IR) images are disclosed and described.

24 Claims, 5 Drawing Sheets

DEPTH-SENSING CAMERA DEVICE HAVING A SHARED EMITTER AND IMAGER LENS AND ASSOCIATED SYSTEMS AND METHODS

BACKGROUND

A three-dimensional (3D) or stereographic image is generally defined as a two-dimensional (2D) image that additionally contains depth information, or in other words distance information from a perceived point near the observer to the various objects, surfaces, etc., in the image. In the simplest case, a stereo camera used to take such 3D images does so by taking two images with separate lenses in the same device that are spaced apart from one another. In such cases, each lens would capture the associated image with a separate image sensor or film frame for each lens. In this manner, binocular vision can be effectively simulated, which for humans, is more effectively simulated when spacing between the lenses approximately equals human intraocular distance.

DESCRIPTION OF EMBODIMENTS

Figure 1A:
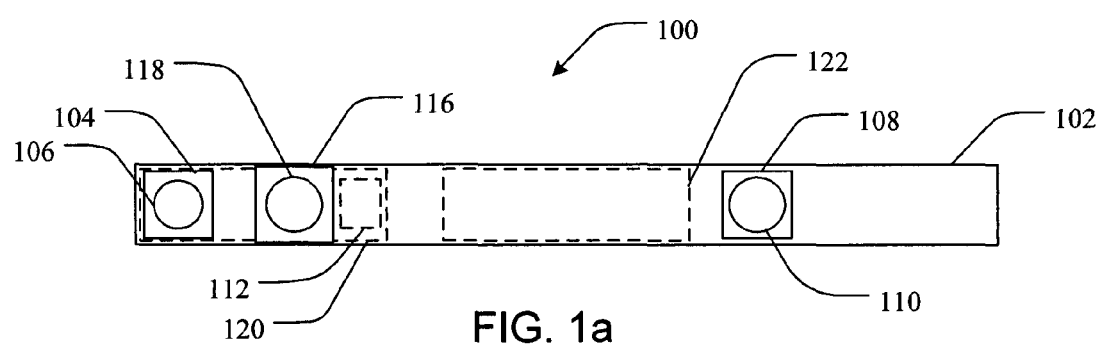
FIG. 1a is a top-down view of a graphical representation of an exemplary device for capturing an IR image.

Although the following detailed description contains many specifics for the purpose of illustration, a person of ordinary skill in the art will appreciate that many variations and alterations to the following details can be made and are considered included herein.

Accordingly, the following embodiments are set forth without any loss of generality to, and without imposing limitations upon, any claims set forth. It is also to be understood that the terminology used herein is for describing particular embodiments only, and is not intended to be limiting. Unless defined otherwise, all technical and scientific terms used herein have the same meaning as commonly understood by one of ordinary skill in the art to which this disclosure belongs.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term in this specification, like "comprising" or "including," it is understood that direct support should be afforded also to "consisting essentially of" language as well as "consisting of" language as if stated explicitly and vice versa.

"The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

As used herein, "enhanced," "improved," "performance-enhanced," "upgraded," and the like, when used in connection with the description of a device or process, refers to a characteristic of the device or process that provides measurably better form or function as compared to previously known devices or processes. This applies both to the form and function of individual components in a device or process, as well as to such devices or processes as a whole.

As used herein, "coupled" refers to a relationship of connection or attachment between one item and another item, and includes relationships of either direct or indirect connection or attachment. Any number of items can be coupled, such as materials, components, structures, layers, devices, objects, etc. Optical coupling, for example, refers to a connection between two elements having an optical component. For example, in a case whereby a light source delivers a beam of coherent light through a lens, the light source and the lens are optically coupled. It is noted that optical coupling does not preclude the elements also being physically or directly coupled. Also, optical coupling does not require an active component, such as a light beam extending from one element to the other. Rather, elements that are part of an optical pathway are said to be optically coupled even in the absence of an optical signal.

As used herein, "directly coupled" refers to a relationship of physical connection or attachment between one item and another item where the items have at least one point of direct physical contact or otherwise touch one another. For example, when one layer of material is deposited on or against another layer of material, the layers can be said to be directly coupled.

Objects or structures described herein as being "adjacent to" each other may be in physical contact with each other, in close proximity to each other, or in the same general region or area as each other, as appropriate for the context in which the phrase is used.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Example Embodiments

An initial overview of technology embodiments is provided below and specific technology embodiments are then described in further detail. This initial summary is intended to aid readers in understanding the technology more quickly, but is not intended to identify key or essential technological features, nor is it intended to limit the scope of the claimed subject matter.

In a stereoscopic depth camera system, two cameras are separated by a distance called the baseline, and are pointed in the same direction. Two images of the same scene are captured, one by each camera. Because of the difference in camera positioning, the objects in each image will be at different locations within the frame of reference. For example, objects captured in the image taken by a left camera will appear further to the right than objects captured in the image taken by the right camera and vice versa. This shift in the pixel data from each image is known as "disparity". In assembling a single three-dimensional image using the data from the right and left images, a system will attempt to identify matching or corresponding pixels from each image.

In assisted stereoscopic depth camera systems, optical projection plays an important role in boosting performance and coverage. The projector serves to illuminate the scene with a textured pattern so that when right and left cameras capture the scene the system will be better able to correctly identify which points in the left image match or correspond to the correct points in the right image. This is true even in the case where the scene has no, or substantially no, native texture such as walls and tables.

The projection pattern used by the projector can be specially optimized for a specific depth algorithm used to determine depth. The projector equipment is often a small single laser emitter that transmits beams through a diffuser or DOE (Diffractive Optical Element) that in turn creates a far field pattern that has proper spatially varying illumination for the given scene. Another patterning technique can utilize a vertical cavity surface emitting laser (VCSEL) as the laser source. Camera hardware capable of utilizing this technique typically has a dedicated imaging lens to project thousands of small dots onto the scene. The aforementioned and other systems require a dedicated optical element and/or a projection lens as a source of illumination.

In one example, a device for capturing an infrared (IR) image is provided. Such a device 100, as is shown in FIGS. 1a,b, can comprise a support substrate 102, a first IR sensor 104 coupled to the support substrate 102, and a first objective lens 106 optically coupled to the first IR sensor 104 and positioned to direct incident light into the first IR sensor 104. It is noted that 104 in FIGS. 1a,b is indicating an enclosure in which the first IR sensor 104 is housed, or in some cases, an enclosure through which light enters along an optical pathway to the first IR sensor 104. As such, the first IR sensor 104 may or may not be physically located in the enclosure. A second IR sensor 108 is coupled to the support substrate 102 and positioned apart from the first IR sensor 104, and a second objective lens 110 is optically coupled to the second IR sensor 108 and positioned to direct incident light into the second IR sensor 108. Furthermore, an active IR source 112 is optically coupled to the first objective lens 106 and is positioned to emit IR light 114 out of the device 100 through the first objective lens 106. Also shown in FIGS. 1a,b, a visible light imager 116 can be coupled to the support substrate 102, and can further include a visible light objective lens 118.

As such, IR light 114 is emitted from the active IR source 112 and out of the device 100 through the first objective lens 106. The IR light 114 illuminates a least a portion of the environment to which the device has been directed, and generates a projection pattern on the environment, objects in the environment, and the like. A portion of the IR light is reflected back toward the device, which is received through the first objective lens 106. As noted, the reflected or returning IR light is thus received into the device through the same lens from which the IR light was originally emitted. Such configuration has a number of advantages compared to traditional designs that include separate lenses for admitting and receiving IR light. For example, the cost of manufacturing is lower due to the device having fewer optical lenses compared to the traditional design. As another example, it is feasible that the measurement accuracy of the device may be increased due to the elimination of the distance disparity between the optical axis of the lens emitting the IR light and the optical axis of the lens receiving the IR light that is present in traditional designs.

Various structural and functional design architectures are contemplated that are capable of emitting IR light from an IR source into an environment and receiving reflections of the IR light back through a single lens. Any design, architecture, methodology, or the like, that is capable of realizing the emission and reception of IR light through a single lens, particularly from an IR source to an IR imager, is considered to be within the present scope. In one example embodiment, however, an optics system 120 can be positioned between the active IR source 112 and the first objective lens 106. The optics system 120 thus transmits emitted IR light from the active IR source 112 to the first objective lens 106, and in turn transmits returning IR light that is incident on the first objective lens 106 to the first IR sensor represented at 104.

Figure 2:
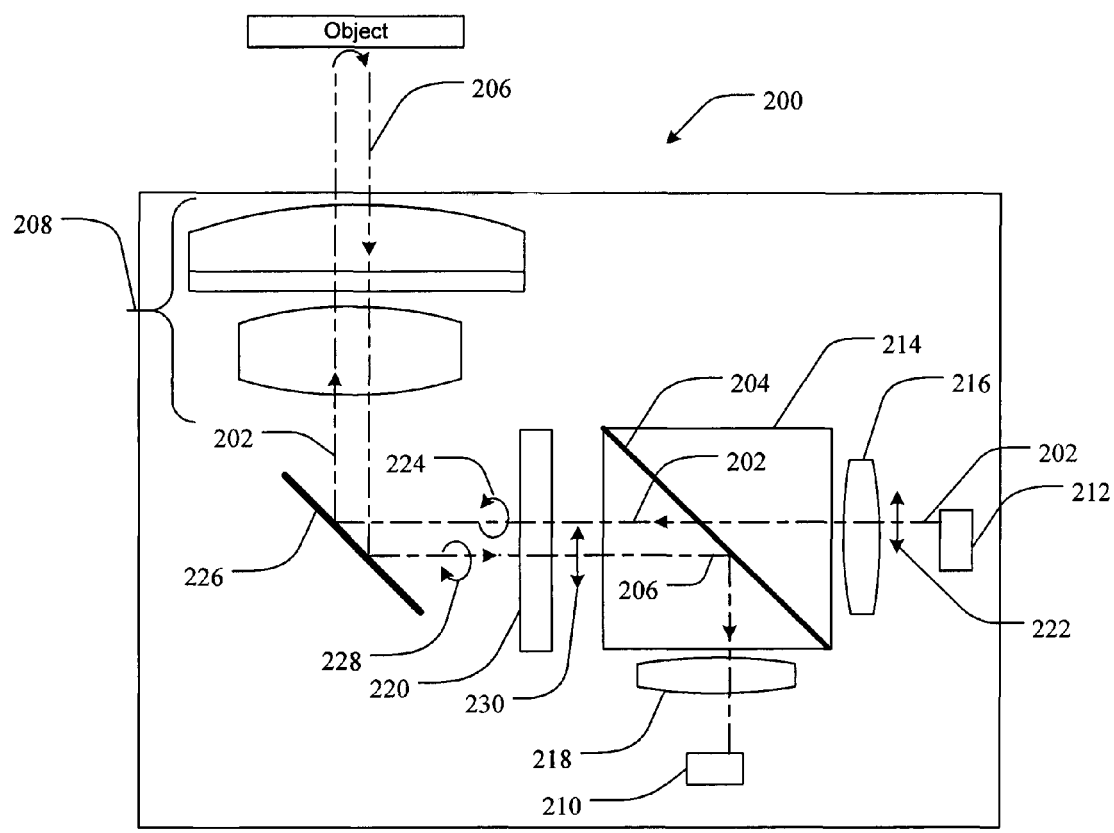
FIG. 2 is a schematic depiction of an exemplary optics system.

One example embodiment of such an optics system 200 is shown in FIG. 2. IR light 202 is emitted from the active IR source 212 and into a polarization beam splitter (PBS) 204 that is optically coupled to the active IR source 212 and oriented orthogonally to the optical axis of the active IR source 212. The PBS 204 is configured to pass emitted IR light 202 therethrough, and to reflect IR light returning from the first objective lens 208, so-called returning IR light 206. Thus, emitted IR light 202 is emitted from the active IR source 212, which passes through the PBS 204 and out of the objective lens 208. Reflected light, including returning IR light 206, passes through the first objective lens 208 and is reflected by the PBS 204 to be delivered at the first IR sensor 210.

The PBS 204 can be positioned directly on a support substrate, or the PBS 204 can be contained in a PBS housing 214, or partially in a PBS or other housing. In one embodiment, the housing 214 can be a functional part of the PBS, or more specifically, can be the PBS. In such cases, the PBS 204 can be an interface between two portions of the PBS housing 214, a wire grid or a wire grid interface, or the like. In one specific embodiment, for example, both the PBS housing 214 and the PBS 204 make up the PBS. In one example of such an arrangement, the PBS housing 214 can comprise two prisms coupled together with a wire grid polarizing filter (represented by 204) along the interface between the prisms.

Additionally, the PBS can be oriented various angles, depending on the intended design of the device. A specific angle or ranges of angles can often depend, at least in part, on the angle of incidence, extinction ratio, and the like. The angle of incidence can be defined as the angle of the deviation of an incoming beam of light from normal (i.e. perpendicular to the surface). The extinction ratio is the ratio of the transmission of the polarized component of light that is being filtered to the transmission of the polarized component of light that is not being filtered, or in other words, is a characterization of the efficiency of the polarization filter. As such, a high extinction ratio can be desirable. Beam splitting polarizers can utilize a variety of polarization mechanisms and therefore can be classified into various non-exclusive categories, including, without limitation, reflective polarizers, birefringent polarizers, thin film polarizers, wire grid polarizers, and the like. Depending on the type of polarizer being used, there may be limits placed on the angle of incidence and/or the potential extinction ratios that are inherent to the polarization mechanism for that type of polarizer. As such, one of ordinary skill in the art would readily be capable of designing an optical system, selecting a PBS, calculating the proper angles of incidence, and implementing such a system once in possession of the present disclosure.

One specific non-limiting example includes wire grid polarizing beamsplitter cubes, such as those produced by Thorlabs®. Such a beamsplitter cube can include an array of parallel metallic wires sandwiched between two prisms. Wire grid polarizers transmit light having an electric field vector perpendicular to the wire and reflect light having an electric field vector parallel to the wire. This cube thus separates the s- and p-polarized components by reflecting the s-polarized component at the wire grid, while allowing the p-polarized component to pass.

Optical lenses can be utilized for a variety of reasons, depending on the overall design, the desired outcome, preferences of the designer, and the like. For example, optical lenses can be utilized to focus or defocus light, redirect light, alter light polarization, filter the light spectrum, as well as other uses. The devices and systems associated with the presently disclosed subject matter can thus include a variety of optical lenses to perform any number of optical tasks. Returning to FIG. 2, an active IR source focus lens 216 can be optically coupled between the active IR source 212 and the PBS 204. Such a lens can focus and direct emitted IR light 202 into the PBS 204. Furthermore, a first IR sensor focus lens 218 can be optically coupled between the PBS 204 and the first IR sensor 210. This lens can thus receive and focus returning IR light 206 from the PBS 204 into the first IR sensor 210.

In another embodiment, the optics system can further comprise a quarter-wave plate (QWP) 220 optically coupled to the active IR source 212 and positioned between the PBS 204 and the first objective lens. A QWP is a wave plate filter that can create circular polarization from linearly polarized light. For example, the double arrows 222 represent the linear polarization (P-incident light) of IR light 202 along the light pathway. Upon passing through the QWP 220, the IR light is left-handed circularly polarized to 224. In one embodiment, the IR light can then be reflected off of an optical mirror 226 that is positioned orthogonally to the optical axis of the active IR source 212, and is optically coupled to the active IR source 212. The optical mirror 226 is operable to reflect emitted IR light 202 toward the first objective lens 208, and reflect returning IR light 206 toward the active IR source 212. Additionally, the now circularly polarized light is further bent 90° by the optical mirror 226 before passing through the first objective lens 208. Returning IR light 206 that is reflected off of the environment passes through the first objective lens 208 and is reflected off of the optical mirror 226 toward the active IR source 212. In the process, the optical mirror 226 bends the returning IR light 206 another 90°, as is shown at 228. The returning IR light 206 is reflected through QWP 220, thus transforming it back to linearly polarized light. Due to the bending of the circularly polarized light, the linearly polarized light is now S-incident light, as is shown by the double arrow at 230. Because of this S-incident orientation, when the returning IR light 206 contacts the PBS 204 it will be bent 90°, in this case through the first IR sensor focus lens 218 to contact the first IR sensor 210. In this manner, the optics system can emit IR light from an IR source, receive and direct reflected IR light to an IR sensor using the optical lens.

Figure 3:
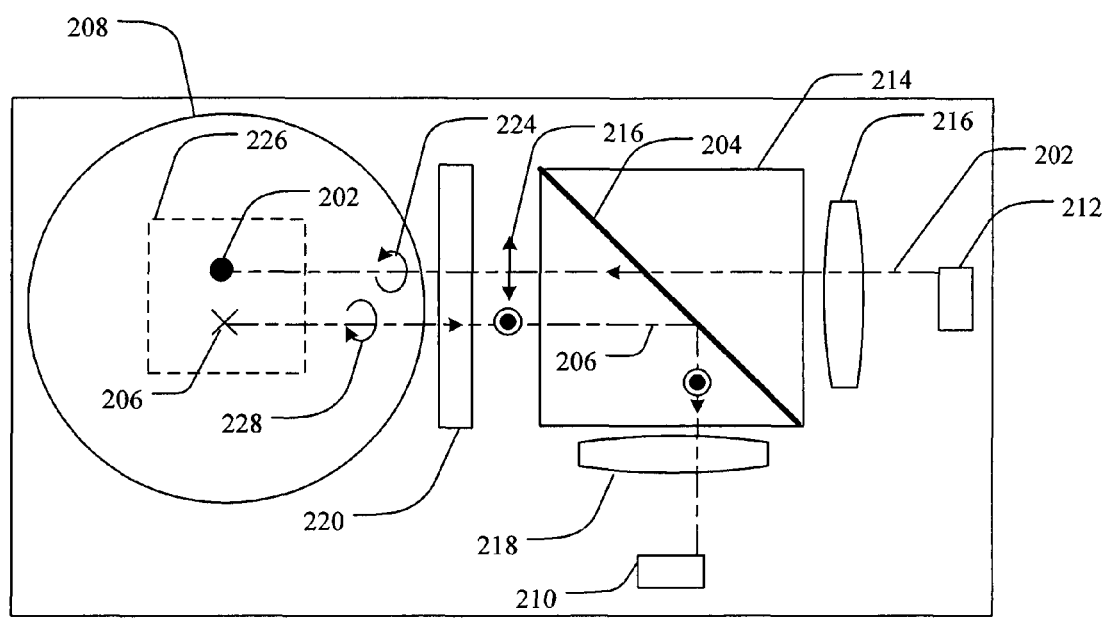
FIG. 3 is a schematic depiction of an exemplary optics system.

FIG. 3 shows another example embodiment of an optics system having a different arrangement of elements compared to those in FIG. 2. It is noted that the enumerations of FIG. 2 have been maintained in FIG. 3, and the descriptions of the various elements are the same or similar unless otherwise noted. The optics system in FIG. 3 has a thinner side profile as compared to that of FIG. 2, because the first IR sensor 210 has been repositioned. In FIG. 2, the first IR sensor 210 was oriented in a downward direction that was parallel to the optical axis of the first objective lens 208. In the embodiment shown in FIG. 3, however, the first IR sensor 210 has been reoriented along a plane that is perpendicular to the optical axis of the first objective lens 208. For this embodiment, the PBS 204, depending on the configuration, is also reoriented such that emitted IR light 202 from the active IR source 212 passes through the PBS, and returning IR light 206 is reflected along the perpendicular plane to the first IR sensor 210. Thus from the view shown, the emitted IR light 202 is reflected by the optical mirror 226 out of the plane of the drawing, which is represented by the solid circle 202. The returning IR light 206 enters the plane of the drawing at the position marked by the "X" 206.

It is noted, that in some embodiments an optical mirror may not be required, or could be positioned or angled differently from what is shown in FIG. 2 or 3, depending on the arrangements of the various components of the device. However, if the specific device design relies on the bending of circularly polarized light in order to realize the S-incident polarization to cause the returning IR light to be bent by the PBS, an alternative method of such circular light bending would be needed.

Additionally, the present scope is not limited to the particular techniques described for polarizing light and performing various transformations on the polarized light to filter the light at the PBS along a different pathway to the first IR sensor. Rather, various other techniques for manipulating IR light (or any other light type) are considered to be within the present scope. Such optical manipulations are known in the art.

The IR source can include any device capable of generating IR light that can be utilized in the capture of images that include depth information. Such sources can include without limitation, devices such as IR LEDs, laser diodes, and the like. In one example, the IR source is operable to generate coherent IR light. In another example, such coherent light can include laser radiation from an IR laser. It is additionally contemplated, that a device can include a plurality of IR generating elements. One example can include a Vertical Cavity Surface Emitting Laser (VCSEL). A VCSEL is an array of micro lasers that projects a pattern onto the environment toward which it is directed. In some cases, a micro lens is placed on the top of each micro laser to steer the laser beam to the desired angle. Such a device can create an effective projection pattern by which to construct a 3D image from the acquired image data. In some cases, a diffuser can be optically coupled to the plurality of IR generating elements. In one embodiment, such a diffuser can be a micro lens array (MLA). Additionally, a diffuser can be optically coupled to single IR source devices.

Furthermore, while IR light has been primarily described, any wavelengths of electromagnetic radiation that can be utilized to derive depth information and that is capable of being incorporated into such a device can be used, and is considered to be within the present scope. In the case of IR light, for example, wavelengths of electromagnetic radiation greater than or equal to 700 nm can be used, although it is additionally contemplated that wavelengths extending down into the visible spectrum can also be utilized as light sources. Furthermore, the light source can generate coherent or non-coherent light, depending on the design of the system. Any type of light, whether coherent or noncoherent, can be utilized provided a projection pattern can be displayed on a surface that can be used to calculate depth information.

Figure 1B:
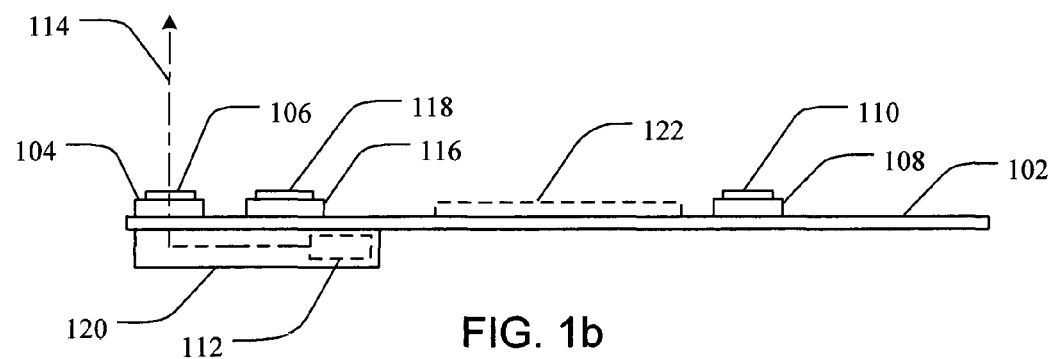
FIG. 1b is a side view of a graphical representation of an exemplary device for capturing an IR image.
Figure 4:
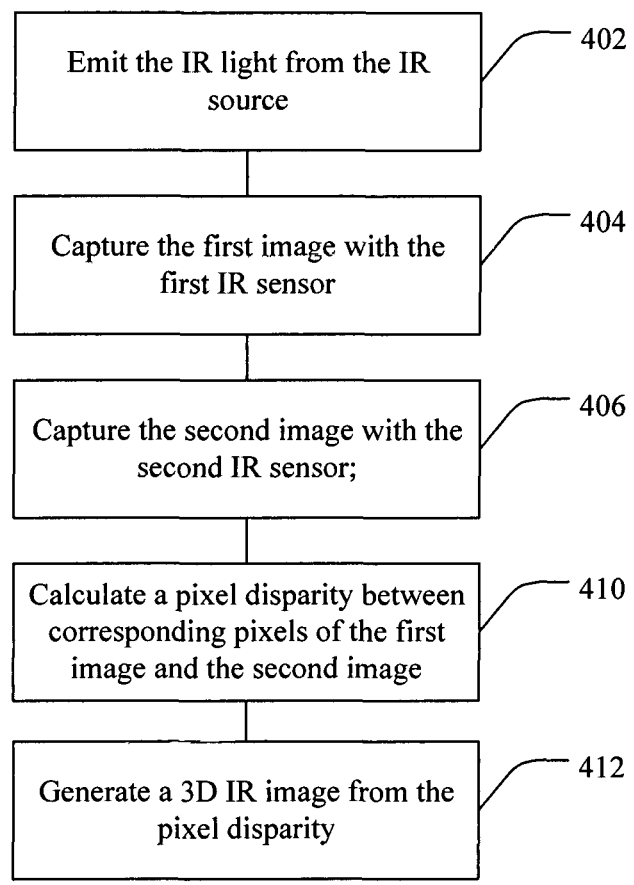
FIG. 4 is a depiction of exemplary circuitry functionality in capturing an IR image.

Returning to FIG. 1, in one embodiment a device can further include circuitry 122. The circuitry can be configured to, as is shown in FIG. 4, 402 emit the IR light from the IR source, 404 capture the first image with the first IR sensor, 408 capture the second image with the second IR sensor, 410 calculate a pixel disparity between corresponding pixels of the first image and the second image, and 412 generate a 3D IR image from the pixel disparity. In one embodiment, the circuitry 122 is further configured to generate the 3D IR image from the pixel disparity by determining a distance from a reference point to pixels in the image sensor plane. In another embodiment, the circuitry 122 is further configured to generate the 3D IR image from the pixel disparity by determining a distance from a reference point to each pixel in the image sensor plane.

Figure 5:
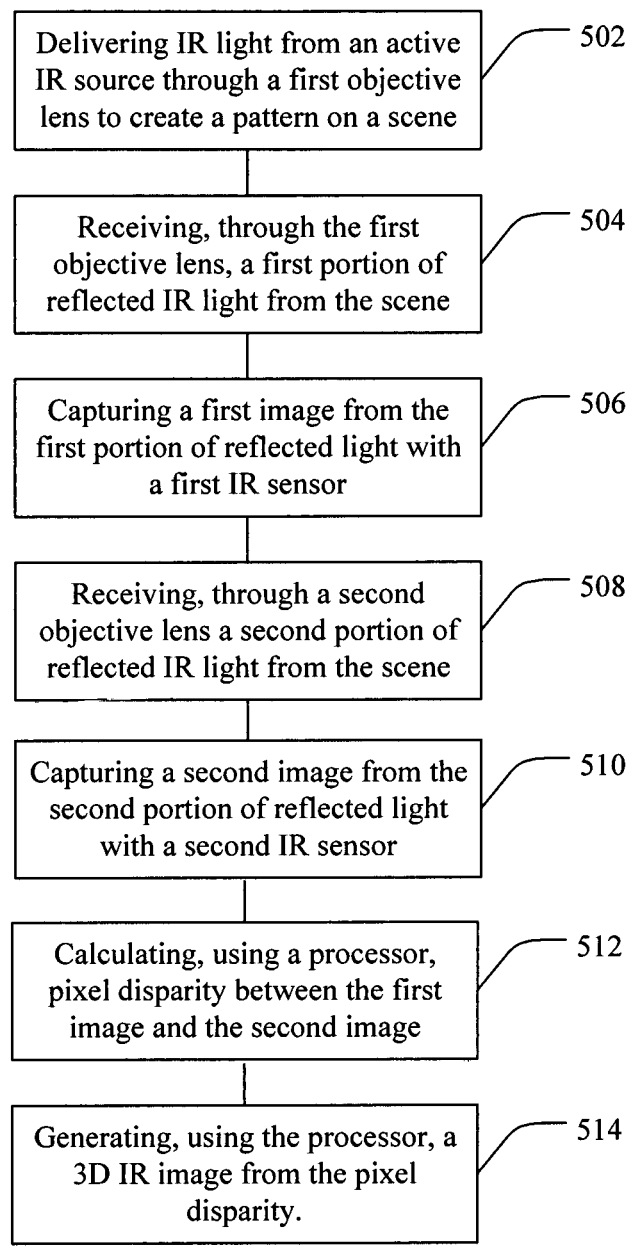
FIG. 5 is a depiction of an exemplary method for capturing an IR image.

In another example, a method for capturing a 3D IR image is provided. Such a method can include, as is shown in FIG. 5, 502 delivering IR light from an active IR source through a first objective lens to create a pattern on a scene, 504 receiving, through the first objective lens, a first portion of reflected IR light from the scene, 506 capturing a first image from the first portion of reflected light with a first IR sensor, 508 receiving, through a second objective lens spaced apart from the first objective lens, a second portion of reflected IR light from the scene, and 510 capturing a second image from the second portion of reflected light with a second IR sensor. The method also includes 512 calculating, using a processor, pixel disparity between the first image and the second image, and 514 generating, using the processor, a 3D IR image from the pixel disparity.

In another embodiment, visual image data can additionally be acquired and processed to generate a 3D visual image. For example, a visual image of the scene can be captured using an RGB or other imager, and the 3D visual image can be generated from the visual image and the pixel disparity. This can be accomplished using any type of processor, process module, software, etc.

In yet another embodiment, a system for capturing a 3D IR image is provided. Such a system can include an image sensor device further comprising a support substrate, a first IR sensor coupled to the support substrate, and a first objective lens optically coupled to the first IR sensor and positioned to direct incident light into the first IR sensor. The system can also include a second IR sensor coupled to the support substrate and positioned apart from the first IR sensor. Additionally included is a second objective lens optically coupled to the second IR sensor and positioned to direct incident light into the second IR sensor. Further, an active IR source is optically coupled to the first objective lens and positioned to emit IR light out of the device through the first objective lens.

The system additionally includes circuitry that is configured to emit the IR light from the IR source, capture the first image with the first IR sensor, capture the second image with the second IR sensor, calculate a pixel disparity between corresponding pixels of the first image and the second image, and generate a 3D IR image from the pixel disparity. The system can also include any number of additional components, elements, peripherals, etc., as per the design of the device. For example, one or more processors or process modules can be included in the system to process data and perform other system functions. The circuitry can therefore include a microprocessor either that is dedicated to image processing, or that can additionally perform other system tasks. In another embodiment, the circuitry can include one or more transitory machine-readable storage mediums and/or one or more transitory machine-readable storage mediums. Such memory mediums can be utilized for short-term processing functions, for long-term storage, for system-related storage tasks, and the like.

The system can additionally include an optics subsystem as has been described herein to facilitate the emission of the IR light from the first objective lens, and to direct returning IR light from the first objective lens to the first image sensor.

The following examples pertain to specific invention embodiments and point out specific features, elements, or steps that can be used or otherwise combined in achieving such embodiments.

EXAMPLES

In one example there is provided, a device for capturing an infrared (IR) image, comprising:
a support substrate;
a first IR sensor coupled to the support substrate;
a first objective lens optically coupled to the first IR sensor and positioned to direct incident light into the first IR sensor;
a second IR sensor coupled to the support substrate and positioned apart from the first IR sensor;
a second objective lens optically coupled to the second IR sensor and positioned to direct incident light into the second IR sensor; and
an active IR source optically coupled to the first objective lens and positioned to emit IR light out of the device through the first objective lens.

In one example of a device, the device further comprises an optics system positioned between the active IR source and the first objective lens, the optics system configured to:
transmit emitted IR light from the active IR source to the first objective lens; and
transmit returning IR light that is incident on the first objective lens to the first IR sensor.

In one example of a device, the optics system further comprises a polarization beam splitter (PBS) optically coupled to the active IR source and oriented orthogonally to an optical axis of the of the active IR source, wherein the PBS is operable to pass emitted IR light through the PBS to the first objective lens and to reflect returning IR light from the first objective lens to the first IR sensor.

In one example of a device, the optics system further comprises a quarter-wave plate (QWP) optically coupled to the active IR source and positioned between the PBS and the first objective lens.

In one example of a device, the optics system further comprises:
an active IR source focus lens optically coupled between the active IR source and the PBS; and
a first IR sensor focus lens optically coupled between the PBS and the first IR sensor.

In one example of a device, the optics system further comprises an optical mirror positioned orthogonally to the optical axis of the active IR source and optically coupled to the active IR source, wherein the optical mirror is operable to reflect emitted IR light toward the first objective lens and reflected IR light toward the active IR source.

In one example of a device, the optical mirror is positioned along the optical axis of the IR source between the first objective lens and the QWP.

In one example of a device, the optical mirror is positioned along the optical axis of the IR source between the QWP and the PBS.

In one example of a device, the device further comprises a diffuser optically coupled to the IR source.

In one example of a device, the IR source is operable to generate coherent IR light.

In one example of a device, the IR source is an IR laser.

In one example of a device, the IR source further comprises a plurality of IR-generating elements.

In one example of a device, the IR source is a Vertical Cavity Surface Emitting Laser (VCSEL).

In one example of a device, the device further comprises a diffuser optically coupled to the plurality of IR-generating elements.

In one example of a device, the diffuser is a micro lens array (MLA).

In one example of a device, the device further comprises a visible light image sensor coupled to the support substrate.

In one example of a device, the device further comprises circuitry configured to:
emit the IR light from the IR source;
capture the first image with the first IR sensor;
capture the second image with the second IR sensor;
calculate a pixel disparity between corresponding pixels of the first image and the second image; and
generate a 3D IR image from the pixel disparity.

In one example of a device, the circuitry is further configured to generate the 3D IR image from the pixel disparity by determining a distance from a reference point to pixels in a sensor image plane.

In one example of a device, the circuitry is further configured to generate the 3D IR image from the pixel disparity by determining a distance from a reference point to each pixel in a sensor image plane.

In one example there is provided, a method for capturing an infrared (IR) image, comprising:
delivering IR light from an active IR source through a first objective lens to create a pattern on a scene;
receiving, through the first objective lens, a first portion of reflected IR light from the scene;
capturing a first image from the first portion of reflected light with a first IR sensor;
receiving, through a second objective lens spaced apart from the first objective lens, a second portion of reflected IR light from the scene;
capturing a second image from the second portion of reflected light with a second IR sensor;
calculating, using a processor, pixel disparity between the first image and the second image; and
generating, using the processor, a 3D IR image from the pixel disparity.

In one example of a method, the method further comprises:

capturing, using an RGB sensor, a visual image of the scene; and generating, using the processor, a 3D visual image from the visual image and the pixel disparity.

In one example of a method, the IR light is coherent IR light.

In one example of a method, the coherent IR light is passed through a diffuser to create the pattern on the scene.

In one example of a method, the IR source is an IR laser.

In one example of a method, the IR source comprises a plurality of IR-generating elements and the pattern on the scene is a plurality of IR emissions from the plurality of IR-generating elements.

In one example of a method, the IR source is a Vertical Cavity Surface Emitting Laser (VCSEL).

In one example of a method, the method further comprises passing the plurality of IR emissions through a diffuser.

In one example of a method, the diffuser is a micro lens array (MLA).

In one example of a method, delivering the IR light from the active IR source through the first objective lens further comprises:

passing the IR light through a polarization beam splitter (PBS) oriented orthogonally to an optical axis of the of the IR source;

altering a polarization characteristic of the IR light to generate altered IR light; and delivering the altered IR light through the first objective lens to create the pattern on the scene.

In one example of a method, altering the polarization characteristic of the IR light further includes passing the IR light through a quarter-wave plate (QWP) to generate circular polarized light as the altered IR light.

In one example of a method, the method further comprises:

receiving the first portion of reflected IR light from the first objective lens; and delivering the first portion of reflected IR light to the PBS, wherein, due to the altered polarization characteristic, the PBS reflects the first portion of reflected IR light to the first IR sensor.

In one example of a method, generating the 3D IR image from the pixel disparity further comprises determining a distance from a reference point to each pixel in the image.

In one example there is provided, a system for capturing an infrared (IR) image, comprising:

an image sensor device, comprising:

a support substrate;

a first IR sensor coupled to the support substrate;

a first objective lens optically coupled to the first IR sensor and positioned to direct incident light into the first IR sensor;

a second IR sensor coupled to the support substrate and positioned apart from the first IR sensor;

a second objective lens optically coupled to the second IR sensor and positioned to direct incident light into the second IR sensor; and an active IR source optically coupled to the first objective lens and positioned to emit IR light out of the device through the first objective lens; and circuitry configured to:

emit the IR light from the IR source;

capture the first image with the first IR sensor;

capture the second image with the second IR sensor;

calculate a pixel disparity between corresponding pixels of the first image and the second image; and generate a 3D IR image from the pixel disparity.

In one example of a system, the circuitry comprises a microprocessor.

In one example of a system, the circuitry comprises a transitory machine-readable storage medium.

In one example of a system, the circuitry comprises a non-transitory machine-readable storage medium.

In one example of a system, the system further comprises an optics system positioned between the IR source and the first objective lens, the optics system configured to:

transmit emitted IR light from the IR source to the first objective lens; and transmit reflected IR light incident on the first objective lens to the first IR sensor.

In one example of a system, the optics system further comprises a polarization beam splitter (PBS) optically coupled to the IR source and oriented orthogonally to an optical axis of the of the IR source, wherein the emitted IR light passes through the PBS to the first objective lens and reflected IR light returning from the first objective lens is reflected by the PBS to the first IR sensor.

In one example of a system, the optics system further comprises a quarter-wave plate (QWP) optically coupled to the IR source and positioned between the PBS and the first objective lens.

In one example of a system, the optics system further comprises:

an IR source focus lens optically coupled between the IR source and the PBS; and a first IR sensor focus lens optically coupled between the PBS and the first IR sensor.

In one example of a system, the optics system further comprises an optical mirror positioned orthogonally to the optical axis and optically coupled to the IR source, the optical mirror being operable to direct emitted IR light toward the first objective lens and reflected IR light toward the IR source.

In one example of a system, the optical mirror is positioned along the optical axis of the IR source between the first objective lens and the QWP.

In one example of a system, the optical mirror is positioned along the optical axis of the IR source between the QWP and the PBS.

In one example of a system, the system further comprises a diffuser optically coupled to the IR source.

In one example of a system, the IR source is operable to generate coherent IR light.

In one example of a system, the IR source is an IR laser.

In one example of a system, the IR source further comprises a plurality of IR-generating elements.

In one example of a system, the IR source is a Vertical Cavity Surface Emitting Laser (VCSEL).

In one example of a system, the system further comprises a diffuser optically coupled to the plurality of IR-generating elements.

In one example of a system, the diffuser is a micro lens array (MLA).

In one example of a system, the system further comprises a visible light image sensor coupled to the support substrate.

In one example of a system, the circuitry is further configured to generate the 3D IR image from the pixel disparity by determining a distance from a reference point to pixels in the 3D IR image.

In one example of a system, the circuitry is further configured to generate the 3D IR image from the pixel disparity by determining a distance from a reference point to each pixel in the 3D IR image.

While the forgoing examples are illustrative of the principles used in various embodiments in one or more particular applications, it will be apparent to those of ordinary skill in the art that numerous modifications in form, usage, and detail of implementation can be made without the exercise of inventive faculty, and without departing from the presented principles and concepts.

What is claimed is:

1. A device for capturing an infrared (IR) image, comprising:
    a support substrate;
    a first IR sensor coupled to the support substrate;
    a first objective lens optically coupled to the first IR sensor and positioned to direct incident light into the first IR sensor;
    a second IR sensor coupled to the support substrate and positioned apart from the first IR sensor;
    a second objective lens optically coupled to the second IR sensor and positioned to direct incident light into the second IR sensor;
    an active IR source optically coupled to the first objective lens and positioned to emit IR light out of the device through the first objective lens;
    an optics system positioned between the active IR source and the first objective lens, the optics system configured to:
        transmit emitted IR light including a projection pattern from the active IR source along an optical axis through the first objective lens; and
        transmit returning IR light including the projection pattern that is incident on the first objective lens along the optical axis through the first objective lens to the first IR sensor; and
    circuitry configured to:
        capture a first image including the projection pattern with the first IR sensor;
        capture a second image including the projection pattern with the second IR sensor;
        calculate a pixel disparity between corresponding pixels of the first image and the second image using the projection pattern; and
        generate a 3D IR image from the pixel disparity.

2. The device of claim 1, wherein the optics system further comprises a polarization beam splitter (PBS) optically coupled to the active IR source and oriented orthogonally to an optical axis of the of the active IR source, wherein the PBS is operable to pass emitted IR light through the PBS to the first objective lens and to reflect returning IR light from the first objective lens to the first IR sensor.

3. The device of claim 1, further comprising a diffuser optically coupled to the IR source.

4. The device of claim 1, wherein the IR source is operable to generate coherent IR light.

5. The device of claim 4, wherein the IR source is an IR laser.

6. The device of claim 4, wherein the IR source further comprises a plurality of IR-generating elements.

7. The device of claim 6, wherein the IR source is a Vertical Cavity Surface Emitting Laser (VCSEL).

8. The device of claim 1, further comprising a visible light image sensor coupled to the support substrate.

9. The device of claim 1, wherein the circuitry is further configured to generate the 3D IR image from the pixel disparity by determining a distance from a reference point to pixels in a sensor image plane.

10. The device of claim 1, wherein the circuitry is further configured to generate the 3D IR image from the pixel disparity by determining a distance from a reference point to each pixel in a sensor image plane.

11. A method for capturing an infrared (IR) image, comprising:
    delivering, using an optics system positioned between an active IR source and a first objective lens, IR light including a projection pattern from the active IR source along an optical axis through the first objective lens to a first IR sensor to create a pattern on a scene;
    receiving, through the first objective lens, a first portion of reflected IR light including the projection pattern from the scene;
    capturing a first image from the first portion of reflected light with a first IR sensor;
    receiving, through a second objective lens spaced apart from the first objective lens, a second portion of reflected IR light including the projection pattern from the scene;
    capturing a second image from the second portion of reflected light with a second IR sensor;
    calculating, using a processor, pixel disparity between the first image and the second image using the projection pattern; and
    generating, using the processor, a 3D IR image from the pixel disparity.

12. The method of claim 11, further comprising:
    capturing, using an RGB sensor, a visual image of the scene; and
    generating, using the processor, a 3D visual image from the visual image and the pixel disparity.

13. The method of claim 11, wherein the IR light is coherent IR light.

14. The method of claim 11, wherein delivering the IR light from the active IR source through the first objective lens further comprises:
    passing the IR light through a polarization beam splitter (PBS) oriented orthogonally to an optical axis of the of the IR source;
    altering a polarization characteristic of the IR light to generate altered IR light; and
    delivering the altered IR light through the first objective lens to create the pattern on the scene.

15. The method of claim 11, wherein generating the 3D IR image from the pixel disparity further comprises determining a distance from a reference point to each pixel in the image.

16. A system for capturing an infrared (IR) image, comprising:
    an image sensor device, comprising:
        a support substrate;
        a first IR sensor coupled to the support substrate;
        a first objective lens optically coupled to the first IR sensor and positioned to direct incident light along an optical axis through the first objective lens into the first IR sensor;
        a second IR sensor coupled to the support substrate and positioned apart from the first IR sensor;
        a second objective lens optically coupled to the second IR sensor and positioned to direct incident light into the second IR sensor;
        an active IR source optically coupled to the first objective lens and positioned to emit IR light out of the device along the optical axis through the first objective lens;

an optics system between the active IR source and the first objective lens configured to transmit emitted IR light, including a projection pattern from the active IR source, and transmit returning light, including the projection pattern incident on the first objective lens through the first objective lens to the first IR sensor; and circuitry configured to:
emit the IR light from the IR source;
capture the first image with the first IR sensor;
capture the second image with the second IR sensor;
calculate a pixel disparity between corresponding pixels of the first image and the second image; and
generate a 3D IR image from the pixel disparity.

17. The system of claim 16, wherein the circuitry comprises a microprocessor.

18. The system of claim 16, wherein the circuitry comprises a transitory machine-readable storage medium.

19. The system of claim 16, wherein the circuitry comprises a non-transitory machine-readable storage medium.

20. The system of claim 16, further comprising a diffuser optically coupled to the IR source.

21. The system of claim 16, wherein the IR source is operable to generate coherent IR light.

22. The system of claim 16, further comprising a visible light image sensor coupled to the support substrate.

23. The system of claim 16, wherein the circuitry is further configured to generate the 3D IR image from the pixel disparity by determining a distance from a reference point to pixels in the 3D IR image.

24. The system of claim 16, wherein the circuitry is further configured to generate the 3D IR image from the pixel disparity by determining a distance from a reference point to each pixel in the 3D IR image.

* * * * *